(No Model.)
A. P. BROOMELL.
COMBINED COOKING AND WATER HEATING RANGE.
No. 498,894. Patented June 6, 1893.
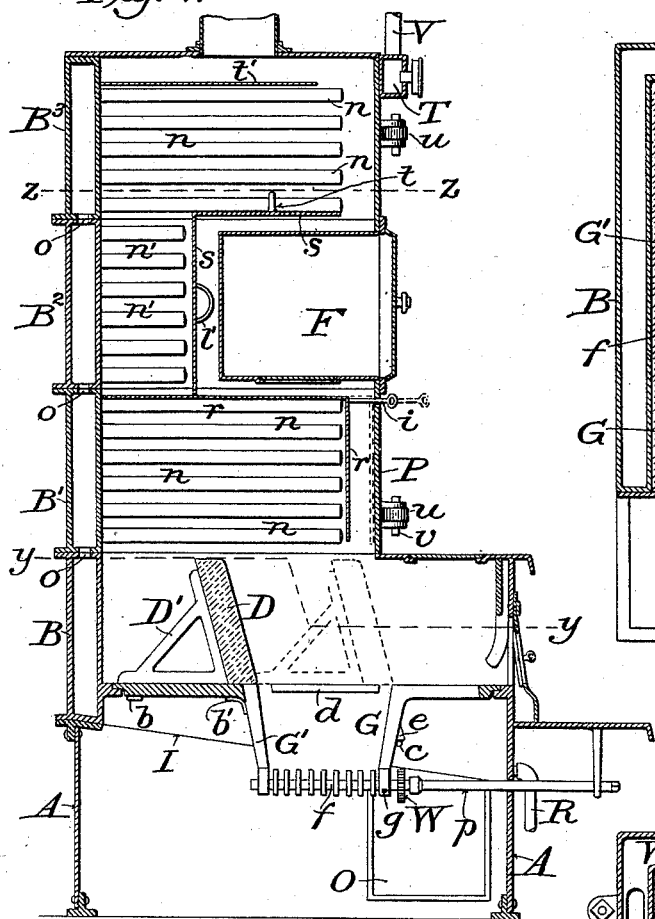
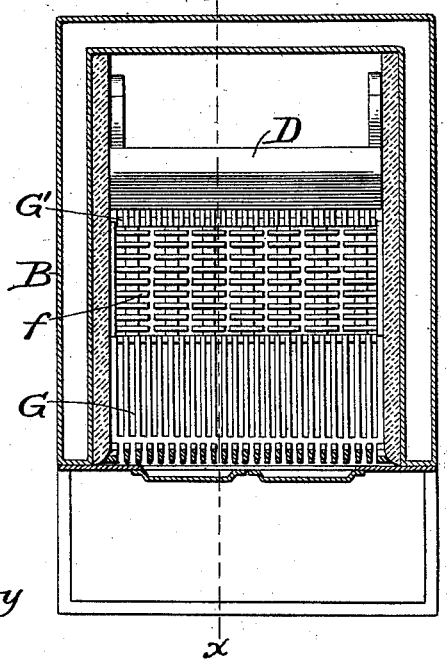
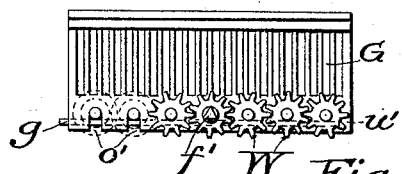
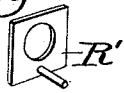
Witnesses:
Roger S. Case
James F. Duhamel
Inventor:
Albert P. Broomell,
by Dodge & Sons,
Attys.

UNITED STATES PATENT OFFICE.

ALBERT P. BROOMELL, OF YORK, PENNSYLVANIA.

COMBINED COOKING AND WATER-HEATING RANGE.

SPECIFICATION forming part of Letters Patent No. 498,894, dated June 6, 1893.

Application filed October 17, 1892. Serial No. 449,081. (No model.)

*To all whom it may concern:*

Be it known that I, ALBERT P. BROOMELL, a citizen of the United States, residing at York, in the county of York and State of Pennsylvania, have invented certain new and useful Improvements in a Combined Cooking and Water-Heating Range, of which the following is a specification.

My present invention relates to combined cooking and heating ranges, and the invention consists in certain improvements hereinafter more fully set forth.

Figure 1 is a vertical section on the line $x$—$x$ of Fig. 2. Fig. 2 is a horizontal section on the line $y$—$y$ of Fig. 1. Fig. 3 is a similar view on the line $z$—$z$ of Fig. 1. Fig. 4 is a front view of a portion of the grate, shown detached, and Fig. 5 is a perspective view of the scraper used for cleaning the flues.

My present invention is an improvement on the combined cooking and heating range for which a patent was issued to me January 20, 1891, No. 445,037, and the object of these improvements is to render the apparatus more perfect in operation, and to simplify and cheapen its construction, but more especially to increase its heating capacity for the extreme cold weather in winter.

I now construct the body of a series of horizontal sections, which are cast with hollow walls extending along the two sides and across the back, as shown clearly in Figs. 2 and 3. The three upper sections B', B² and B³ are made of uniform size, while the lower section B has its side walls extended forward alongside of the fire box as shown in Figs. 1 and 2,—its lower edge being inclined downward toward the front, as indicated by the line 1 in Fig. 1, so as to bring the water chambers in its sides down alongside of the drop grate, hereinafter described. The whole rests upon a cast iron base A the side walls of which are correspondingly inclined, and which forms the ash pit, and which has a door O in its side near the front, as shown in Fig. 1, and which may be located at either or both sides as preferred. The object of locating this door at the side, is to enable the grate bars to be changed when necessary, as will be hereinafter explained. The inner and outer walls of the several sections are connected at top and bottom by a transverse web W', as shown in Fig. 3, which is provided with oblong openings O for the passage of the water from one section to another—the raised edges around these openings being planed off true so as to fit one upon another water tight when suitably packed and bolted together, as is customary in sectional cast iron boilers—the sections being provided with ears or lugs as shown for that purpose. The inner and outer walls are also fastened together by stay bolts, in the usual manner, these not being shown in the drawings. To secure a greater heating surface, I now use much smaller tubes and more of them, they being preferably, inch tubes.

To simplify the construction, and afford greater convenience in inserting, repairing and cleaning these tubes $n$, they are screwed into the inner wall of the back as shown in Figs. 1 and 3, their front ends being closed. I fill the entire body from the fire chamber to the top with these small tubes, they being arranged in transverse rows, those in one row being arranged opposite the spaces in the adjoining rows so as to cause the heat and smoke to pass around and among them all. This like my former device is provided with an oven, and in order to provide room for it, a portion of the tubes are made shorter as shown, these shorter tubes being marked $n'$ in Fig. 1. The space in rear of the oven and over it, is shut off from the tubes by a sheet metal partition or plate $s$ which is bent at a right angle as shown in Fig. 1, it being held in place by two or more loops or eyes $t$ which slide over the tubes, and thus hold it suspended in place. It is provided with a couple of handles or loops $l'$, as shown, by which it can be drawn out, when the front is removed or swung around out of the way. Underneath this flue plate $s$, and under the oven, I locate another and similar plate $r$, it also being bent at a right angle as shown in Fig. 1, its vertical portion extending down in front of the ends of the tubes, and its horizontal portion resting on a row of the tubes, and extending from the front end of the tubes to the back, it with the plate $s$ forming the rear wall of a heat flue which extends from the fire chamber up to and around the oven as shown in Fig. 1—these plates $r$ and $s$ extending across from side to side. The lower plate $r$ is movable, and is provided with a handle or rod $i$ which projects at the front as shown, so that this plate can be made to act as a damper. When shoved back as shown in full lines the heat is permitted to pass up around the oven; but when drawn forward as shown in dotted lines, the heat and smoke is shut off from the oven and is caused to pass back among the tubes below the horizontal portion of the plate, and up past its rear end, among the tubes $n'$, and from thence up among the tubes $n$ above the oven, and is then deflected by a baffle plate $t'$ which rests upon the upper tier of tubes, to the front, and then back to the smoke pipe P'.

The front P, of the elevated portion of the body, above the cooking top is made removable, it being held at each side, top and bottom by a hinge which engages with ears $u$ on the front of the side walls as shown in Fig. 3, the pintles $v$ of these hinges being loose so that they can be lifted out. By taking out the two on either side, the front plate—to which the oven F is secured—can be swung around on the other two, the object of this arrangement being to enable the front to be swung in either direction as circumstances may require; or, by removing all four of the pintles the front plate P with the oven attached can be removed bodily. In either case, the tubes will all be left exposed by simply removing the plates $s$ and $r$, when they can readily be cleaned by means of a scraper R' Fig. 5, and which consists of a piece of sheet metal having a rod attached for a handle, and having one or more holes in it of a size corresponding to that of the tubes, so that it can be shoved back and forth on the tubes, thus quickly scraping off the accumulated soot and ashes. This method of constructing the body and arranging the tubes, together with the use of such a large number of small tubes, greatly increases the heating surface and renders the cleaning of the tubes much more easy.

In my former patent I described a means for changing the size of the fire chamber by making the rear wall thereof movable forward and back. In my present device I retain this feature, and add thereto another means for increasing the heating capacity of the fire chamber, and which consists in constructing the grate with what may be termed a pocket or depressed portion, as shown in Fig. 1. The special construction of this grate is not herein described, as it will form the subject of a separate application. By this means, as will readily be seen, the size of the fire chamber can be varied to a much greater extent than in my previously patented apparatus; and that while its capacity for increasing the heat in the winter time is greatly enlarged, this arrangement in connection with the plates $r$ and $s$ enables the heat to be shut off from the water tubes almost entirely, it passing among only a comparatively small number of the tubes near the top, just sufficient to furnish hot water for culinary or other domestic uses, in case it be desired, thus much better adapting the apparatus to both winter and summer use.

One great advantage of the pocket and its rotary or shaking grate is, that the fire under the water tubes can be thoroughly cleared of ashes and made to burn up more freely without disturbing the fire on the front or stationary part of the grate which is directly under the cooking top, and thus the cooking is not at all interfered with, while the heating of the water used for warming the house may be increased, as is frequently desirable in very cold mornings, or during an unusually cold spell of weather. By these means I add to the apparatus the advantages of a shaking grate, and provide means for replacing them whenever desired without disturbing any of the other parts. It will be observed that by extending the water space down into the lower section, and below the hearth, I not only bring it alongside of the fire chamber, but also enable the return pipe R to be connected at the front as shown in Fig. 1, the flow or other pipe or pipes V at the top also being at the front. This is the more important from the fact, that as a general rule, the apparatus is set in a recess, which renders it difficult and frequently impossible to get at either the back or the sides to make the connections.

The apparatus is of course provided with the usual flat top projecting at the front and provided with holes for kettles, &c., for cooking, the same as in my former patent, but which being common, require no description.

My improved apparatus is found in practice to be capable of doing all the cooking for a family, and also heating houses containing from five to seven rooms, by the use of a single fire, thus saving much labor and care, and greatly economizing in fuel.

I am aware that it is common to construct cast iron boilers in sections, and also to construct boilers with horizontally projecting water tubes, and therefore I do not claim these separately or combined broadly, but What I do claim as my invention is—

1. A combined cooking and water-heating range having its body composed of a series of horizontal sections rectangular in form, each section above the fire chamber having its back and two sides made hollow for the reception of water and provided with a series of closed ended water tubes secured to its back wall, and a lower section having its hollow sides extended to the front and below the hearth, all constructed and arranged to operate substantially as and for the purpose set forth.

2. The combination in a combined cooking and water-heating range of the detachable oven F, the horizontal tubes $n$ and $n'$, and the removable shield or plate $s$ arranged in relation to the oven and the tubes as shown, whereby said plate is made to serve as the wall of a flue to conduct the heat around the oven, and can be removed at will for cleaning the tubes, as set forth.

3. In combination with the horizontally arranged tubes n and n' and oven F, the movable L shaped plate r arranged in relation to the tubes and the oven as shown and described, whereby it is made to serve both as a wall for the heat flue under the oven and also as a damper for shutting the heat off from the oven and throwing it back among the water tubes when desired.

4. The combination in a combined cooking and water heating range, of a flat or cooking top at the front with a horizontal grate underneath the same for cooking purposes, a series of water heating tubes in the body of the range in rear of the cooking top, with a secondary or depressed grate in rear of the cooking grate, and a movable back piece arranged to cover the rear or depressed grate when drawn forward, whereby said rear or depressed grate can be thrown into or out of use at will, substantially as and for the purpose set forth.

In witness whereof I hereunto set my hand in the presence of two witnesses.

ALBERT P. BROOMELL.

Witnesses:
GORGES J. SCHASZBERGER,
MAUD V. CHAMBERLIN.